United States Patent

[11] 3,582,199

| [72] | Inventor | Bert Barr |
| | | St. Clair, Ill. |
| [21] | Appl. No. | 782,165 |
| [22] | Filed | Dec. 9, 1968 |
| [45] | Patented | June 1, 1971 |
| [73] | Assignee | Essex Manufacturing Co. Inc. |
| | | St. Louis, Mo. |

[54] FILM PROJECTION UNIT
6 Claims, 10 Drawing Figs.

[52] U.S. Cl. .................................................... 352/104,
352/34
[51] Int. Cl. .................................................... G03b 21/10
[50] Field of Search .......................................... 352/34, 35,
104, 242, 243, 136; 353/18, 67, 74, 101

[56]                References Cited
               UNITED STATES PATENTS

| 3,040,622 | 6/1962 | Reddle et al. | 352/104X |
| 3,078,093 | 2/1963 | Hotkins et al. | 352/104X |
| 3,159,077 | 12/1964 | Hoag et al. | 352/104X |
| 3,213,750 | 10/1965 | Eggert | 353/101X |
| 3,375,054 | 3/1968 | Hughes | 352/242X |
| 3,391,979 | 7/1968 | Lessler | 352/104X |

FOREIGN PATENTS

| 6,510,955 | 4/1966 | Netherlands | 352/104 |

*Primary Examiner*—Donald O. Woodiel
*Attorney*—Ralph W. Kalish

ABSTRACT: A film projection unit comprising a cabinet having a viewing screen, a film projector provided within said cabinet and being located downwardly of said screen, a reflector located within said cabinet for reflecting light rays from said projector onto said screen for viewing exteriorly of the cabinet, a coin acceptor, and circuitry adapted for energizing said projector for a predetermined time increment responsive to insertion of a coin within the coin acceptor.

INVENTOR
BERT BARR
BY Ralph W. Kalish
ATTORNEY

INVENTOR
BERT BARR
BY Ralph W. Kalish
ATTORNEY

INVENTOR
BERT BARR

BY Ralph W. Kalish

ATTORNEY

FILM PROJECTION UNIT

BACKGROUND AND SUMMARY OF THE INVENTION

This invention relates in general to projectors for pictures and visual information and, more particularly, to a self-contained projection unit adapted for operation responsive to coin deposit.

It is an object of the present invention to provide a projection unit for films, including film strips, slides and the like which is substantially self-contained incorporating a cabinet having a screen for viewing exteriorly of the cabinet, a projector, and novel circuitry for effecting automatic operation of a projector for a preselected time interval.

It is another object of the present invention to provide a projection unit of the type stated which incorporates a projector adapted for disposition spacedly downwardly of the screen and means for reflecting light rays from said projector onto said screen.

It is a further object of the present invention to provide a projection unit of the type stated adapted for operation responsive to coin reception.

It is another object of the present invention to provide a projection unit of the character stated embodying circuitry for causing operation of the projector upon insertion of a coin within the unit and having novel timing components for establishing energization for predetermined time intervals; and which circuit is so conceived as to be resistant to accidental disruption thereby conducing to the operation of the unit without constant personnel attention.

It is a further object of the present invention to provide a projection unit of the type stated which is of relatively simple construction, being amenable to composition by conventional components; which is durable and reliable in usage; and which is so constructed as to permit of ready access to the constituents for observation and/or repair.

DESCRIPTION OF THE PREFERRED EMBODIMENT

Figure 1:
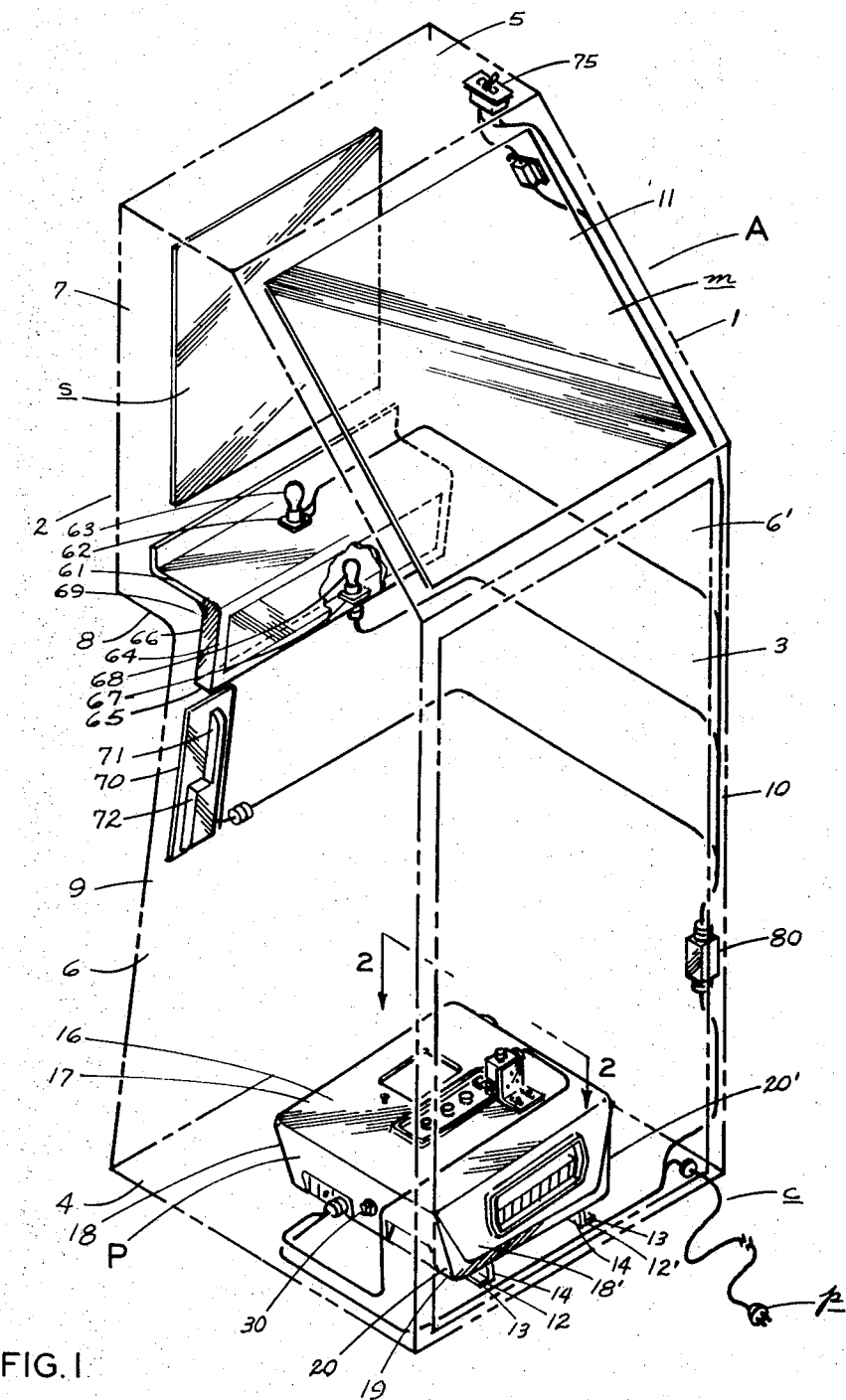
FIG. 1 is a perspective view of a projection unit constructed in accordance with and embodying the present invention, with the sides of the cabinet being rendered transparent.

Referring now by reference characters to the drawings which illustrate the preferred embodiment of the present invention, A generally designates a projection unit comprising a cabinet 1 having a front wall 2, rear wall 3, bottom wall 4, top wall 5 and, opposed, parallel sidewalls 6, 6'. Front wall 2 includes an upper portion 7, which terminates, in its lower end, above the transverse centerline of said wall 2 for continuation with an inwardly extending horizontal, or shelf-forming, section 8, the inner end of which constitutes the upper margin of the lower portion 9 of front wall 2, which latter inclines forwardly and downwardly to its line of merging with bottom wall 4. Rear wall 3 comprehends a lower vertical portion 10, the upper edge of which terminates in substantial alignment with horizontal section 8 of front wall 2 and an upper portion 11 which inclines forwardly and upwardly for joinder at its upper end to top wall 5 which is, perforce, of relatively reduced depth. Lower portion 10 of rear wall 3 may be constituted of a hingedly mounted closure so as to permit facile access to the interior of cabinet 1.

Secured upon bottom wall 4 is a pair of parallel, horizontally spaced apart elongated projector support members 12, 12', the axes of which are along paths extending from the front to the rear of cabinet 1. Said members 12, 12' are of angle stock each having a lower horizontal mounting flange 13 and a vertical flange 14 with the respective horizontal flange 13 being directed laterally outwardly. The vertical flange 14, of each mounting member 12, 12', is provided with an aperture, or elongated slot, 15 extending throughout substantially the length of the related member 12, 12' for purposes presently appearing.

Presented for mounted disposition upon said members 12, 12', is a film projector P, which may be of conventional construction, and being adapted for use with film, slides, film strips and the like. For purposes of illustration only, the projector shown is of the type for use with 8 mm. movie film provided in a cartridge package. Projector P is broadly of conventional character but, as will be described hereinbelow, incorporates novel structure for adapting the same to effect upwardly directed discharge of light rays as contradistinguished from current projectors designed solely for horizontal projection. Projector P embodies a casing 16 having a top wall 17, forward and rearward wall 18, 18', a bottom wall 19 and opposed sidewalls 20, 20' presented respectively adjacent cabinet sidewalls 6, 6'. Fixed upon bottom wall 19, adjacent sidewalls 20, 20', and depending from the under surface thereof, are elongated mounting brackets 21, 21' respectively, being of angle form and so disposed as to cause the vertical flanges 22, 22', respectively thereof, to be located in planarwise parallel relation to the vertical flange 14 of the proximate mounting member 12, 12' and immediately laterally outwardly thereof. Each of said flanges 22, 22' are provided with a plurality of apertures 23 for alignment with slots 15 of mounting members 12, 12'. Extensible through said apertures 23 and slots 15 are externally threaded stems or shanks 24, of a bolt 25, having a winged head 26. Carried upon shank 24 of each bolt 25 for reception within the adjacent slot 15, is an annulus 27, as formed of relatively hard material, such as, conceivably, nylon or the like, so that by tightening a nut 28 engaged on the inner end of the related shank 24, said annulus will be brought into friction-producing engagement with the inner face of the adjacent flange 22 so as to maintain projector P in preselected position with respect to members 12, 12'. It will be seen that said members 12, 12' constitute tracks along which projector P may be readily translated through loosening of nuts 28 so as to permit of disposition of projector P immediately adjacent rear wall portion 10 for ease of inspection and service; said annuli 27 serving as rollers for facilitating such translation. Furthermore, the coaction of members 12, 12' and brackets 21, 21' provide adjustability of projector P forwardly and rearwardly of cabinet 1 as may be requisite for film projection.

Figures 7, 8, 9:
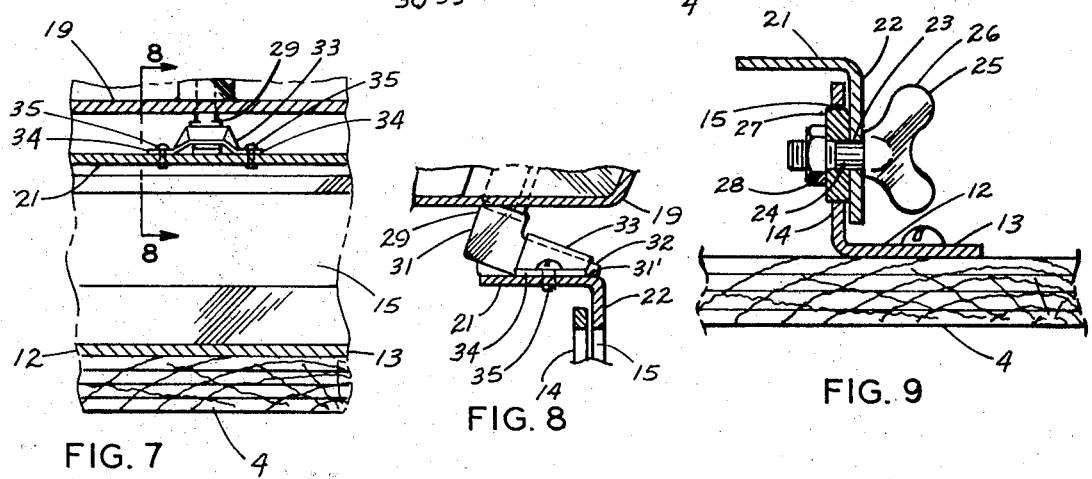
FIG. 7 is a vertical transverse sectional view taken on the line 7-7 of FIG. 5.
FIG. 8 is a vertical view, in partial section taken on the line 8-8 of FIG. 7.
FIG. 9 is a vertical transverse sectional view taken on the line 9-9 of FIG. 6.

Projector P is provided with an elevation leg 29 which, in conventional manner, extends upwardly within casing 16 for connection to an adjusting screw 30, operation of which effects raising or lowering of the proximate end of projector P for projection control purposes. At its lower end, beneath casing 16, leg 29 mounts a shoe 31 having a lower horizontal surface 31' for disposition upon the upper surface of the horizontal flange of mounting bracket 21 (FIG. 8) and further having an inwardly and downwardly inclined upper surface 32; there being a correspondingly formed strap plate 33 extending across said upper surface 32 and being provided with horizontal lugs 34 drilled for securement to said horizontal flange of bracket 21 by means of screws 35. By the foregoing, it will thus be observed that the mounting of projector P upon members 12, 12' does not in any way inhibit the operation of the projector elevation control assembly.

Mounted on top wall 17 of casing 16 is a control panel, indicated 36, and having a start button 37, a stop button 38, a volume control button 39, a focus control button 40 and a framing lever 41. Said start button 37 is presented beneath a push-type solenoid 42 for alignment with the plunger 43 thereof, for purposes presently to be described; said solenoid 42 being mounted upon a bracket 44 fixed on top wall 17 of casing 16.

Figure 2:
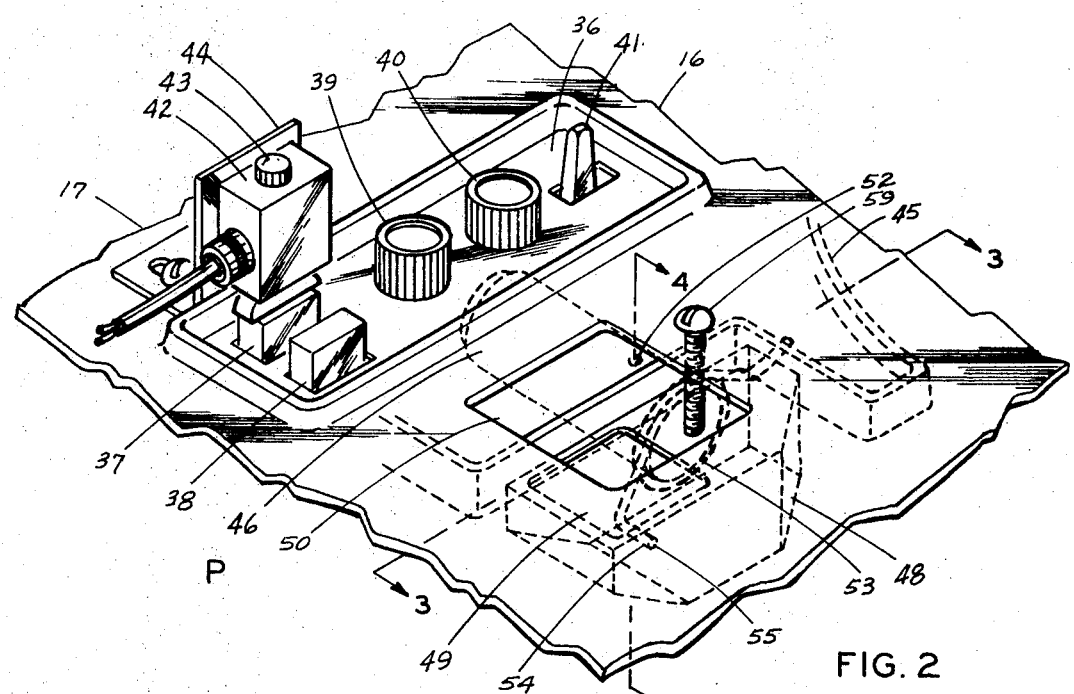
FIG. 2 is a fragmentary perspective view taken substantially along the line 2-2 of FIG. 1 with the projector casing being partially broken away.
Figure 3:
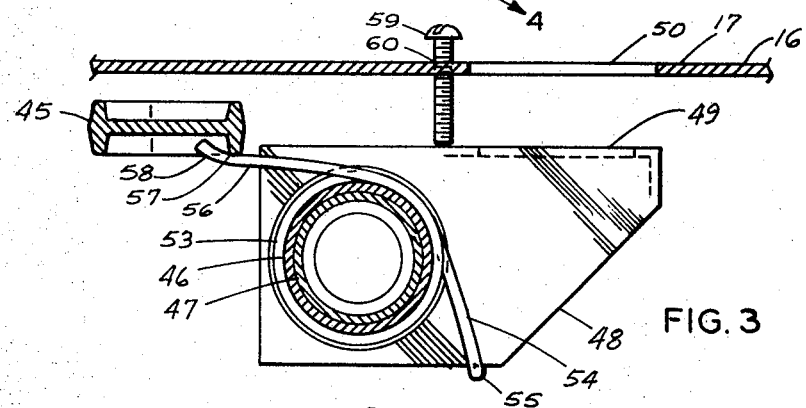
FIG. 3 is a vertical transverse sectional view taken on the line 3-3 of FIG. 2.
Figure 4:
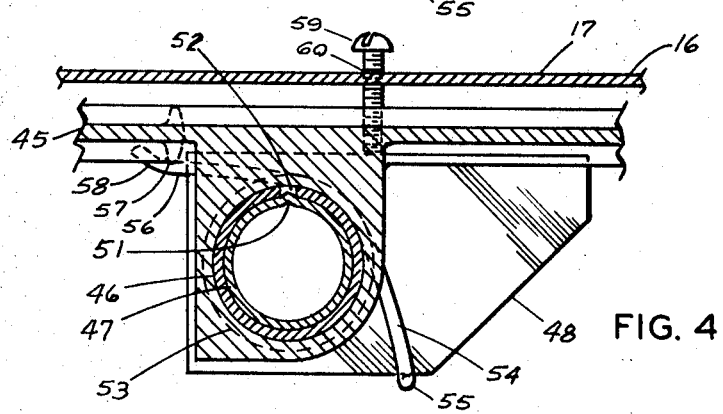
FIG. 4 is a vertical transverse sectional view taken on the line 4-4 of FIG. 2.
Figure 5:
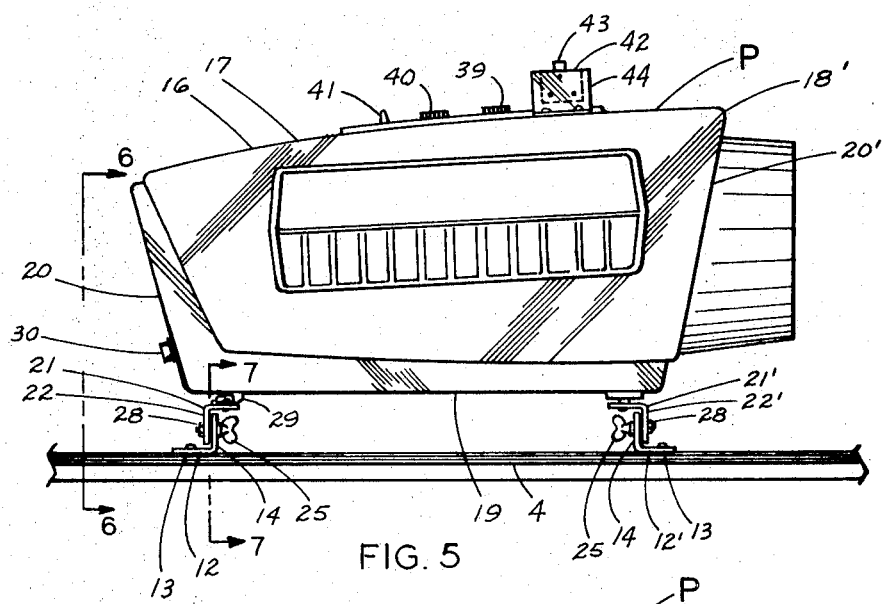
FIG. 5 is a rearward elevational view of the projector.
Figure 6:
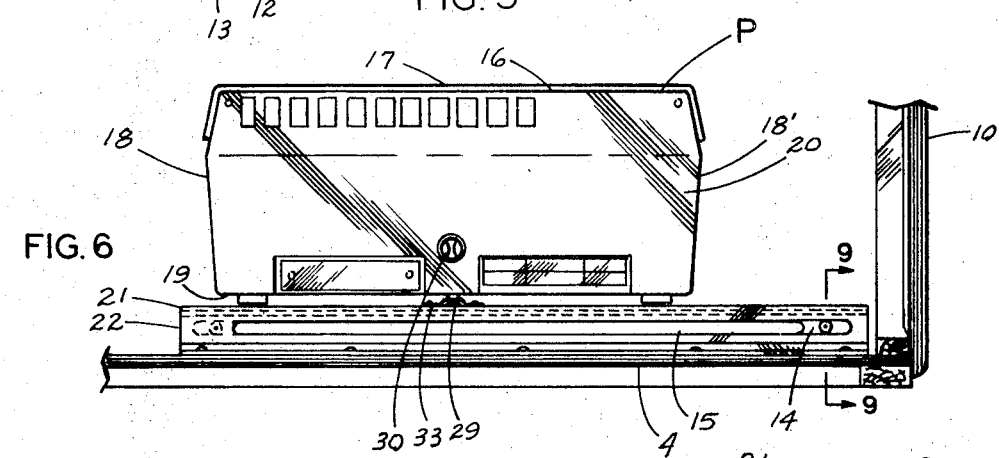
FIG. 6 is an end elevational view of the projector as seen from the left side of FIG. 1.

Turning now to FIGS. 2, 3, and 4, it will be observed that internally of casing 16, projector P is provided with a main frame 45 incorporating a horizontally presented, cylindrical lens mount 46 extending lengthwise of cabinet 1 for receiving a barrel member 47 containing a focusing lens (not shown); said barrel member 47 having an outside diameter substantially equivalent to the inside diameter of lens mount 46 but being adapted for relative rotative movement therein. At its forward end, barrel 47 is integral with a housing 48 for reflecting prism, or mirror, system (not shown), with the remote end of said housing opening upwardly, as at 49, for direction toward a window 50 provided in top wall 17 of casing 16. In order to prevent accidental rotation of barrel 47 within mount 46 so as to assure alignment of housing opening 49 with window 50, barrel 47 is provided with a protuberance 51 in one portion of its sidewall for reception within a socketlike opening 52 provided in the upper portion of the wall of mount 46 so as to retain barrel 47 together with integrated housing 48 to assure of proper light discharge. Encirclingly disposed about barrel 47 immediately adjacent its point of connection to housing 48, is coil spring 53, as of the so-called "mouse trap" type, having an extension 54 at its end proximate housing 48 which extension incorporates a finger 55 for projection beneath the bottom wall of housing 48 so as to bear against same, tending to exert an upward bias. At its other end, spring 53 embodies an extension 56 which is of such length as to project beneath the adjacent portion of frame 45 bearing against a lug 57 depending therefrom; said extension 56 being turned upwardly at its extremity, as at 58, to prevent inadvertent loss of contact with said lug, which latter counters the bias of said extension 56. Abutting against the upper surface of housing 48, proximate its light discharge opening, is a set screw 59 which is threadably received within a tapped opening 60 in top wall 17 of casing 16 (FIG. 3), whereby the head of said screw 59 is presented for convenient manipulation. Thus, the focusing lens assembly and light reflective system is maintained against inadvertent shifting by reason of the coaction of protuberance 51 and socket 52; spring 53, with its extensions 54 and 56; and screw 59. These expedients thus serve to stabilize the device so that it will, at all times, assure of requisite projection of the light rays. It is understood that projector P incorporates the usual projection lamps, condensing lenses, and film supports. It is also to be recognized that projector P may be equipped with current, well-known means for reproducing sound for accompanying the visual material projected.

Light rays emitted from projector P through window 50 continue upwardly within cabinet 1, for impingement upon a mirror m, mounted upon the inner surface of the inclined upper portion 11 of rear wall 3, for reflection therefrom toward a screen 5, of ground glass, suitably mounted within a window provided in upper portion 7 of front wall 2, whereby the projected matter may be viewed from the exterior of cabinet 1.

Secured upon the inner surface of transverse section 8 of front wall 2, is a mounting plate 61 provided with an electrical socket 62 for receiving an indicator lamp 63, which is in circuit by conductors, to a source of power (not shown) for purposes to be described. Integrally formed with mounting plate 61 is a receptacle-forming component 64, which depends therefrom in immediate adjacency to the inner face of the upper portion of front wall section 9. Said component 64 comprises a base flange 65 and side flanges 66; there being a socket 67 mounted in said base flange 65 for receiving a marquee lamp 68 (see FIG. 10) for illuminating a transparent panel 69 formed in front wall 2. Said socket 67 is connected by leads, to be identified below, to a source of power.

Conveniently mounted upon front wall 2, is a coin receptor, indicated at 70, incorporating a coin receiving slot 71, the upper end of which opens through front wall 2, a lockout solenoid 72 and a microswitch 73 (see FIG. 10), said latter being adapted for circuit closure upon passage of a coin through slot 71. Solenoid 72 and switch 73 are suitably connected to a source of power, as will be more fully developed hereinbelow, with respect to the electrical system of the present invention.

Figure 10:
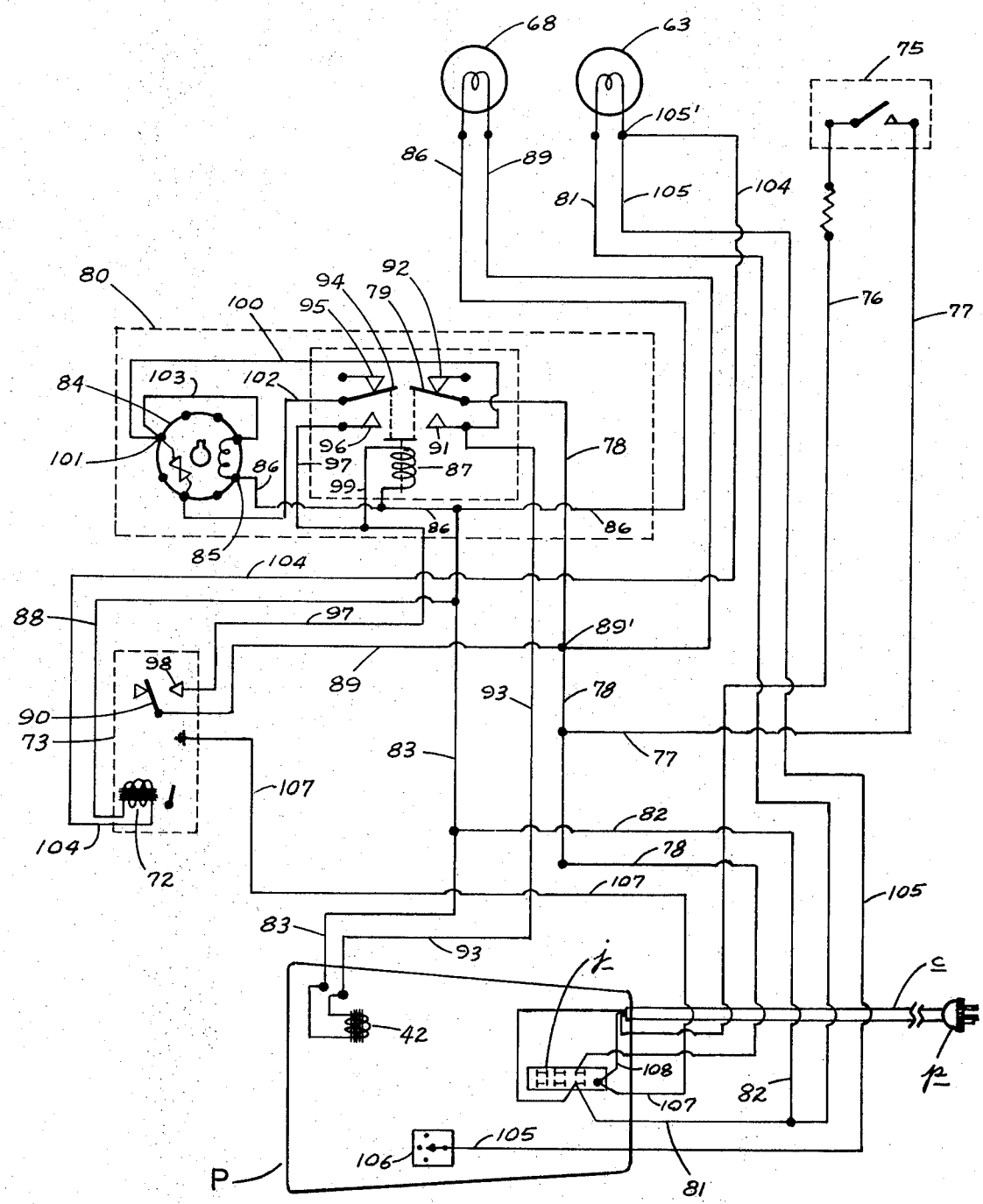
FIG. 10 is a wiring diagram of the circuit of the present invention.

Referring now to FIG. 10, which presents a diagram of the wiring system within unit A for integrating same with the particular circuitry of projector P, the operation of the present invention will become readily apparent.

Seventy-five designates a master switch which, for purposes of convenience, is mounted on the top wall 5 of cabinet 1 being connected by a lead 76 to a source of power (not shown); said lead being accepted within a cable chaving a plug pfor facile connection to a conveniently located, electrical outlet. The other side of switch 75 is connected by conductors 77, 78 to one switch arm 79 of a time delay-relay switch assembly, indicated generally 80. Conductor 78, and hence conductor 77, are also connected through a junction box jto a lead 81, which latter is connected to one side of indicator lamp 63 and also in circuit by conductors 82, 83 with one side of push-type solenoid 42 and a time delay circuit breaker 84, as at contact 85. Lead 83 is also in circuit, by means of a conductor 86 with one side of a solenoid 87 incorporated within switch assembly 80. Lead 83 is also in circuit with one side of solenoid 72 by conductor 88. Conductor 86, at its other end, is connected to one side of marquee lamp 68. The other side of marquee lamp 68 is in circuit by means of a conductor 89 with the switch arm 90 of microswitch 73; said conductor 89 being also connected to conductor 78, as at 89'. By the foregoing, the connection of master switch 75 through conductor 77 and the associated leads to push-type solenoid 42, lockout solenoid 72, microswitch 73, switch assembly solenoid 87, indicator lamp 63 and marquee lamp 68 is established. Switch arm 79 of switch assembly 80 is adapted for engagement with one or the other of contacts 91, 92; the former being in circuit with one side of push-type solenoid 42, by a lead 93; said latter contact 92 being open. Switch assembly 80 also incorporates a second switch arm 94, movable between contacts 95, 96, the former being open and the latter being in circuit, by conductor 97, with a terminal 98 of microswitch 73. Conductor 97 is also in circuit with one side of solenoid 87, by a branch lead 99. Contact 91 is also connected to circuit breaker 84 by lead 100, as at 101. Switch arm 94 is conductively engaged to circuit breaker 84 by connector 102. It will, thus, be seen, that switch assembly 80 incorporates a double-throw, double-pole relay, by reason of the companion switch arm 79, 94 and associated contacts. Completing the internal circuit of switch assembly 80, is a conductor 103 between spaced apart contacts on circuit breaker 84.

The other side of lockout solenoid 72, that is the one remote from connection to conductor 88, is in circuit by a lead 104 to one side of indicator lamp 63 by means of connection to conductor 105, as at 105'; said conductor 105 being in circuit at its other end to the normally open side of a projector microswitch 106. To complete the connection for lockout solenoid 72, there is provided a ground lead 107 which, through junction box j, is connected to the source of power by a lead 108 passing through cable c.

Although the circuitry within projector P is not disclosed, it should be recognized that microswitch 106 is adapted, by readily understood means, for effecting connection to the power source through junction box j. Said microswitch 106 is of the multipole type for connection to projector P, indicator lamp 63 and lockout solenoid 72; being normally in circuit closed relationship with respect to indicator lamp 63.

With master switch 75 in closed condition and indicator lamp 63 illuminated, an individual wishing to operate the present invention will deposit a coin of preestablished denomination within coin acceptor chute 71. The deposited coin will mechanically cause switch arm 90 to be moved into circuit closing condition with terminal 98 of microswitch 73 effecting energization of solenoid 87 resulting in arms 79, 94 of switch assembly 80 being drawn into conducting relationship with contacts 91, 96 respectively. The closure of the circuit through contact 91 will cause energization of push-type solenoid 42 to effect operation of plunger 43 which engages start button 37 to institute running of projector P. The circuit closure through contact 96 of switch assembly 80, has several results, one being to open the circuit between contact 98 and switch arm 90 of microswitch 73 so as to ready same for reception of a subsequent coin; another such result being to bring about energization of circuit breaker 84, which latter is preferably of the temperature-responsive type, incorporating heat transducers (not shown). After the circuit breaker temperature has reached a predetermined point, the same will cause the circuit therethrough to open, thereby producing a deenergization of solenoid 87, whereupon erstwhile attracted switch arms 79, 94, through normal bias, will withdraw from contacts 91, 96 into engagement with open contacts 92, 95 respectively. By this action, solenoid 42 will be deenergized, permitting return of the associated plunger 43 to inoperative position, allowing start button 37 to be relieved of the applied pressure. However, said start button 37, when in depressed, or circuit closing condition, also, by means not shown, causes microswitch 106 to be activated so that the same results in the circuit, at indicator light 63, being opened, with extinguishment of the light, and the circuit to projector P being closed, as well as, to lockout solenoid 72 through lead 104.

In view of the foregoing, it is evident that circuit breaker 84 has been preset for causing circuit-opening after a predetermined time interval which, for example, might be in the vicinity of 5 seconds; which interval is of sufficient extent so as to cause push-type solenoid 42 to be energized to bring about activation of the circuit of projector P. As will be noted, when projector P is operating so that images are directed upon screen s, indicator light 63 will be "off". Also observable from the above, lockout solenoid 72 will be energized during running of projector P so that coin acceptor 70 will reject any coin that one might attempt to insert therein during such period. The circuit of projector P embodies well-known means so as to cause same to revert to open condition after a preselected time increment, determined by the length of the material to be projected. At such juncture, microswitch 106 will be actuated to open the circuit at projector P and close same through indicator light 63, whereby the latter will signal the nonoperative condition of unit A or, in the alternative, the readiness of the same to receive an initiated coin. Such operation of microswitch 106 will concurrently cause a deenergization of lockout solenoid 72 to permit the circuit to be coin operated.

The present invention, accordingly, constitutes a self-contained unit integrally incorporating a compact cabinet 1 adapted for relative ease of transportability; a projector P located within the base and being uniquely adapted for light transmission upwardly for ultimate viewing of an image on a cabinet-mounted screen through a reflector; together with novel circuitry so as to cause the projector P to be operated responsive to receipt of a coin within the device and to project the particular matter for a predetermined time interval. An operator need merely connect the customary plug to a convenient source of electric power, such as a wall socket, and said unit is fully operative. The master switch 75 prevents premature operation and the associated circuitry is of such relative simplicity as to assure of reliable operation of unit A without the intervention of service personnel. By reason of the unusual mounting of projector P, the same is stabilized against undesired vibration or shifting, as well as, being amenable to convenient inspection for observation or service purposes.

Having thus described my invention, what I claim and desire to obtain by Letters Patent is

1. A coin operated projection unit comprising a cabinet having a front wall, a rear wall, parallel sidewalls, and top and bottom walls, said walls cooperating to define an enclosure, a projector including a light source and a projection lens system provided within said enclosure; a pair of spaced-apart tracks mounted on said bottom wall and having axes parallel to the sidewalls of said cabinet; track engaging elements carried on said projector for movably mounting said projector on said tracks for selected disposition thereon between said cabinet front and rear walls, light reflecting means provided on said enclosure upwardly of said projector; an image-receiving screen mounted in the upper portion of the front wall for receiving light from said light reflecting means, means provided in said projector for projecting light rays upwardly, and means for actuating said projector responsive to the reception of the coin within said unit.

2. A coin-operated projection unit as defined in claim 1 and further characterized by said track engaging elements comprising a pair of runners mounted on said projector for cooperatively engaging said track members.

3. A coin-operated projection unit comprising a cabinet having a front wall, a rear wall, parallel sidewalls and top and bottom walls, said walls cooperating to define an enclosure, a projector including a light source and a projection lens system provided on said bottom wall, light reflecting means provided in said enclosure upwardly of said projector, an image-receiving screen mounted in the upper portion of the front wall for receiving light from said light reflecting means; means provided in said projector for projecting light rays upwardly; a coin acceptor mounted on said front wall, a coin switch associated with said acceptor being closable upon engagement by a coin deposited in said acceptor; projector circuit means provided within said projector, a start button switch mounted on said projector for initiating operation of said projector circuit means upon depression of said button, a push-type solenoid mounted on said projector in axially aligned relationship with and upwardly of said start button solenoid operative circuit means connecting said coin switch and said push-type solenoid so that upon closure of said coin switch, said push-type solenoid will be energized for engaging said start button switch to initiate operation of said projector circuit means.

4. A coin-operated projection unit comprising means defining an enclosure, a projector including a light source and a projection lens system disposed within said enclosure, light reflecting means provided in said enclosure upwardly of said projector, an image-receiving screen mounted on said means defining an enclosure for receiving light from said light reflecting means, a means for actuating said projector responsive to the reception of a coin within said unit, said projection lens system comprising a cylindrical housing, a barrel rotatively disposed in said cylindrical housing, a projection lens mounted in said barrel, a prism housing integral with said barrel and having horizontally presented light discharge outlet for directing emitted rays upwardly, cooperating means provided on said cylindrical housing and said barrel to prevent relative rotative movement, and a resilient member being disposed about said cylindrical housing and having end extensions for bearing engagement against adjacent portions of said prism housing and said projector for maintaining prism housing against accidental shifting.

5. A coin-operated projection unit as defined in claim 4 and further characterized by said resilient member comprising a coil spring encirclingly disposed about said cylindrical housing, said end extensions formed integral with said coil, one end extension incorporating a finger for engagement beneath said prism housing, the other end extension having a terminal portion bearing against said projector.

6. A coin-operated projection unit comprising a cabinet having a front wall, a rear wall, parallel sidewalls and top and bottom walls, said walls cooperating to define an enclosure, a projector including a light source in a projection lens system provided on said bottom wall, light reflecting means provided in said closure upwardly of said projector, an image-receiving screen mounted in the upper portion of the front wall for receiving light from said light reflecting means; means provided in said projector for projecting light rays upwardly; a coin acceptor mounted on said front wall, a first switch associated with said acceptor being closable upon engagement by a coin deposited in said acceptor; first circuit means provided within said projector, a start button mounted on said projector for initiating operation of said first circuit means upon depression of said button; a push-type solenoid mounted on said projector in axially aligned relationship with and upwardly of said start button; second circuit means connecting said first switch and said push-type solenoid so that upon closure of said first switch, said push-type solenoid will be energized for engaging said start button to initiate operation of said first circuit means; a time delay switch provided in said second circuit means for maintaining said push-type solenoid in energized condition for a predetermined time interval, said push-type solenoid being deenergized after such predetermined time interval.